Dec. 21, 1965   W. J. CONOVER   3,224,414
FARM ANIMAL FEEDING STRUCTURE FLOOR
Filed Jan. 15, 1964   2 Sheets-Sheet 1

INVENTOR
WILLIAM J. CONOVER
BY
Robert Henderson
ATTORNEY

Dec. 21, 1965   W. J. CONOVER   3,224,414
FARM ANIMAL FEEDING STRUCTURE FLOOR
Filed Jan. 15, 1964   2 Sheets-Sheet 2
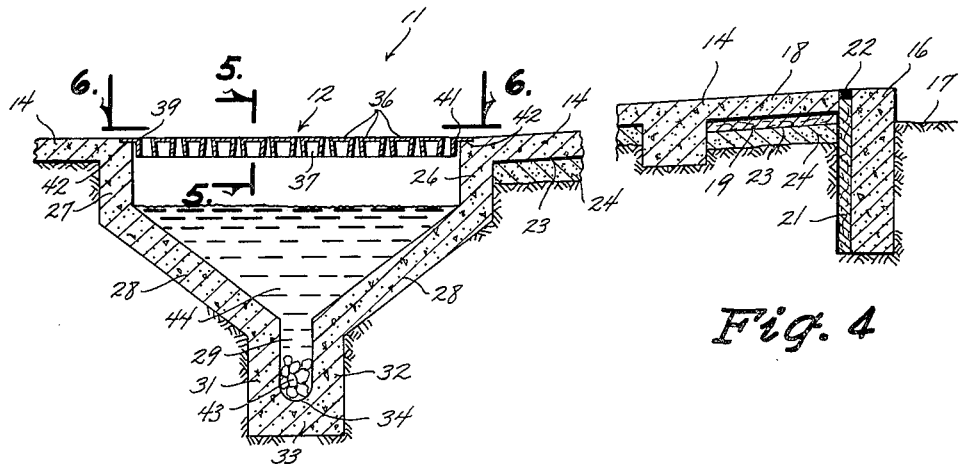
Fig. 3
Fig. 4
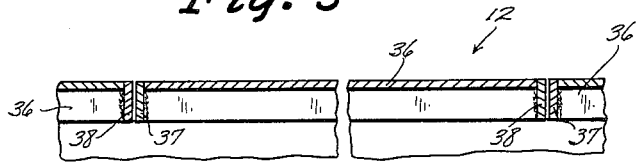
Fig. 5
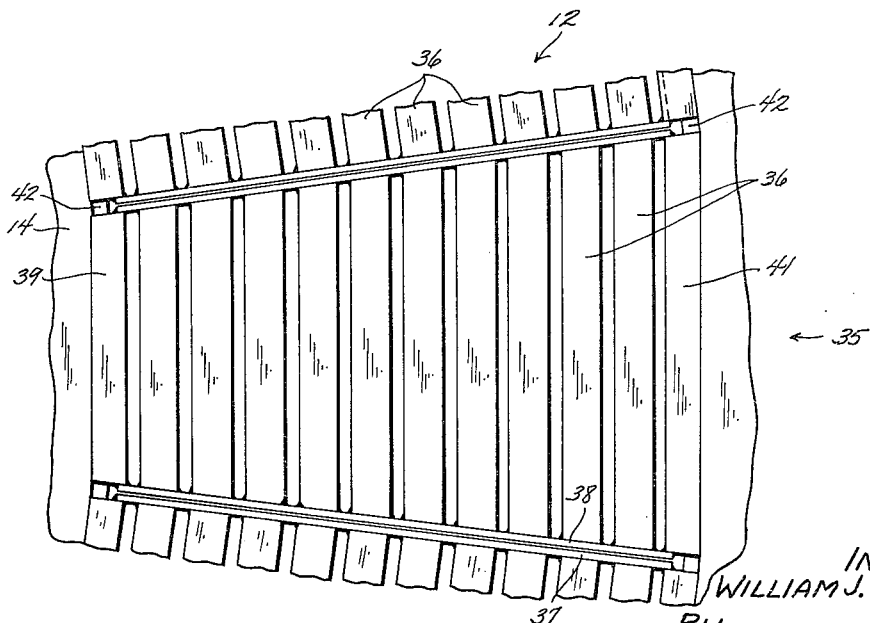
Fig. 6
INVENTOR
WILLIAM J. CONOVER
BY
R. Robert Henderson
ATTORNEY

United States Patent Office 3,224,414
Patented Dec. 21, 1965

3,224,414
FARM ANIMAL FEEDING STRUCTURE FLOOR
William J. Conover, Rhodes, Iowa, assignor to Black, Sivalls & Bryson, Inc. (B. S. & B.), Kansas City, Mo., a corporation of Delaware
Filed Jan. 15, 1964, Ser. No. 337,776
1 Claim. (Cl. 119—28)

This invention relates generally to a farm animal feeding structure, and more particularly to a floor arrangement for removing animal offal and other wastes from the structure.

One conventional means for removing such wastes is a floor having a trench dug in the ground beneath the surface of the floor and covered with a grate or the like. The normal shape of this type of trench is rectangular, having straight sides and a flat bottom. The difficulty with a trench of this formation, when used for removing animal wastes of a liquid and solid nature, is that over a period of time the efficiency of the trench becomes less and less.

The flat bottom of the trench soon becomes covered with cones or mounds of solid material which forces the liquid waste to flow around these cones. As the cones continue to grow or become higher, it is readily apparent that drainage and removal of the waste occurs more slowly. Mechanical means for breaking up the solid cones and for opening up the trench must then be used.

An object, therefore, of this invention is the provision of an improved floor arrangement for expediting the removal of animal and other wastes therefrom.

It is another object of this invention to overcome the disadvantages of the aforementioned drainage trench, and to provide a new and novel trench for draining the liquid and solid wastes from the floor of a farm animal feeding structure.

Another object of this invention is to provide a drainage trench which obviates the formation of cones or mounds of solid waste therein.

Yet another object of this invention is the provision of a drainage trench which utilizes the hydraulic pressure of liquid waste to force continual removal of solid waste.

It is another object of this invention to provide a drainage trench capable of attaining the above mentioned objectives which is economical to build, efficient in use, and easily maintained.

These objects, and other features and advantages of this invention will become readily apparent upon reference to the following description and the accompanying drawings, wherein:

FIG. 3 is an enlarged, vertical sectional view taken along the line 3—3 of FIG. 1;

FIG. 4 is an enlarged, vertical sectional view taken along the line 4—4 of FIG. 1;

FIG. 5 is an enlarged, broken sectional view taken along the line 5—5 of FIG. 3; and FIG. 6 is an enlarged, fragmentary plan view of a segment of an annular grate for the drainage trench of this invention.

Figure 1:
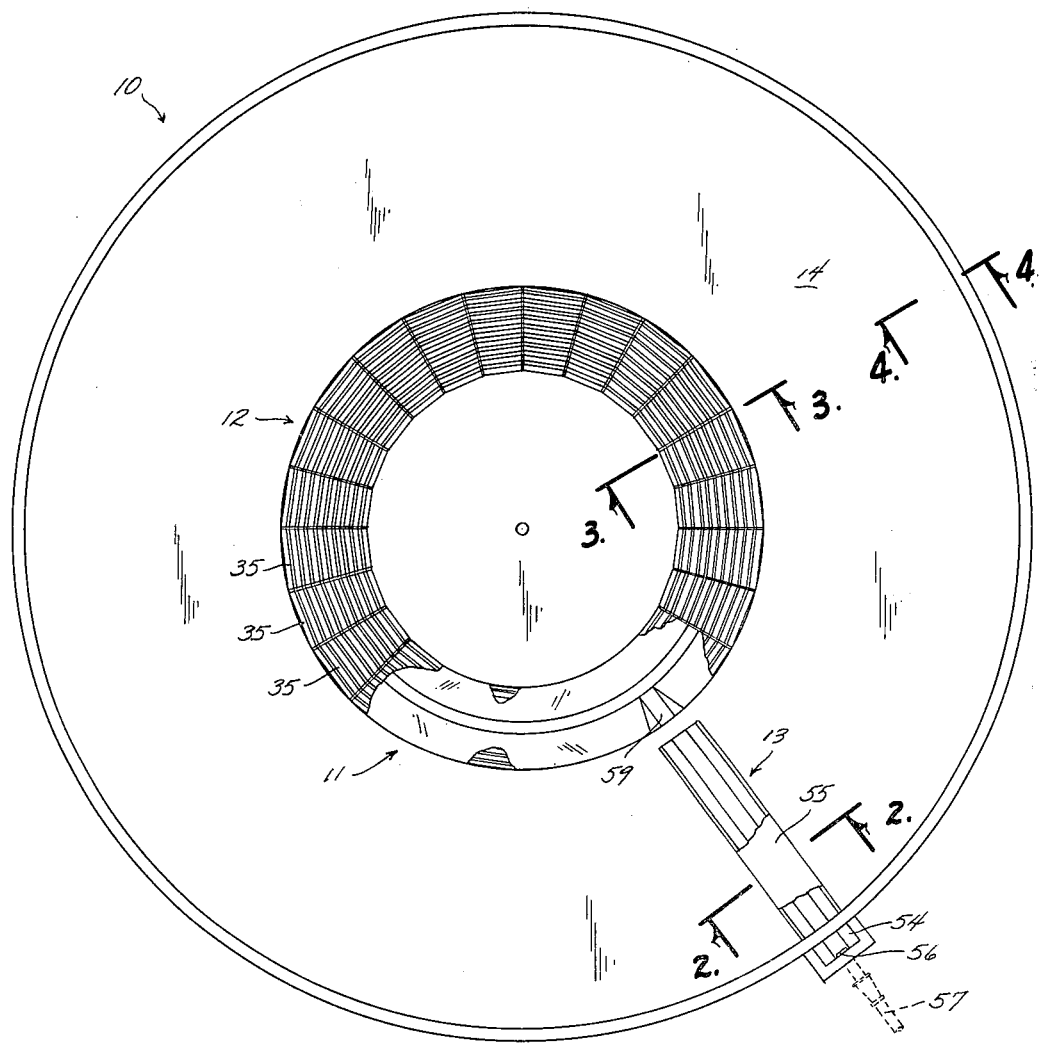
FIG. 1 is a plan view of a farm animal feeding structure embodying the present invention, certain parts broken away for clarity of illustration.

Referring now to the drawings, the circular floor of a farm animal feeding structure is indicated generally at 10 in FIG. 1, and includes an annular drainage trench indicated generally at 11, a grate 12, and a radial discharge trench 13 leading externally of the floor 10.

The floor 10 includes a circular slab 14 (FIGS. 3 and 4) surrounded by an annular ring 16 of concrete formed in the earth 17. Beneath the outer portion 18 (FIG. 4) of the slab 14 is a layer of styrofoam 19 or the like, and another vertical layer of styrofoam 21 (FIG. 4) is placed against the inside of ring 16 beneath a strip 22 of mastic. To provide a moisture barrier, a polyethylene film 23 is placed beneath the styrofoam 19 and the remainder of the floor 10, and over a layer of gravel 24. A downward slope from the periphery of the floor 10 toward the center thereof is formed on the surface of the floor slab 14 as illustrated in FIGS. 3 and 4.

The drainage trench 11 is best shown in FIG. 3 and its cross-sectional formation is identical throughout the entire circumference. A pair of substantially vertical, radially spaced outer and inner walls 26 and 27, respectively, define the upper transverse width of the trench 11, with the outer wall 26 being slightly higher than the inner wall 27 so as to maintain the slope of the floor slab 14. Extending downwardly from the walls 26 and 27, and depending radially inwardly toward each other in a converging manner, are a pair of side walls 28 of identical angular relation to the outer and inner walls.

The preferred angular relation of each side wall 28 from the vertical is approximately 45°, and thus the angular relation thereof with the horizontal is also substantially approximately 45°. A relatively narrow channel 29 is formed between the lower ends of the side walls 28 by a pair of vertical, radially spaced bottom walls 31 and 32, depending to join an interconnecting base portion 33 for the trench 11. It is noted that the bottom surface 34 of the channel 29 is rounded in a semi-circular manner. A modification of this formation would be a V-shaped bottom surface.

The drainage trench 11 therefore has a cross-sectional shape substantially identical throughout its circumferential length, and which is defined by the respective inner and facing surfaces of the upper walls 26 and 27, the side walls 28, and the bottom walls 31 and 32, with the bottom walls interconnected to form the bottom surface 34.

The grate 12 (FIGS. 3, 5 and 6) comprises a plurality of segments 35 (FIG. 1), each segment including a plurality of substantially U-shaped members 36 supported in a parallel, radially spaced, side-by-side formation. The lengths of the members 36 are graduated as best seen in FIG. 6 to provide for their ends being secured to a pair of side plates 37 and 38 which extend in a radial manner. Each segment 35 is therefore pie-shaped in plan view.

The inner and outer members 39 and 41 (FIG. 3) are right angular and are arranged with their horizontal flanges extended outwardly for supporting each grate segment 35 upon shoulders 42 provided therefor in the floor slab 14. The space between the members 36 is sufficient to permit offal and other wastes to fall through the grate 12 and into the drainage trench 13, but is narrow enough to prevent injury to any of the animals normally using the floor structure 10.

Figure 2:
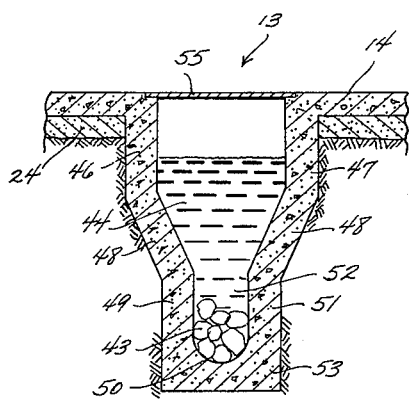
FIG. 2 is an enlarged, vertical sectional view taken along the line 2—2 of FIG. 1.

A discharge trench 13 (FIGS. 1 and 2) is provided for draining the solid and liquid wastes, indicated generally at 43 and 44, respectively, in FIG. 2, off from the annular trench 11 to a septic tank or the like (not shown). The trench 13 is considerably narrower than the drainage trench 11, and is provided with arcuately spaced, vertical upper walls 46 and 47, downwardly converging side walls 48, and a pair of arcuately spaced, vertical bottom walls 49 and 51 defining a rounded bottom channel 52 within a base 53. The bottom surface 50 (FIG. 2) of the channel 52 is curved in a semi-circular manner. The side walls 48 depend angularly from the vertical at approximately 22°. A flat cover plate 55 (see also FIG. 1) is provided for covering the trench 13 and maintaining a flat floor surface thereover.

The portion 54 (FIG. 1) of the discharge trench 13 external of the floor structure 10 is provided with a drain plug and sleeve unit 56, which is connected to a drain tile 57 leading beneath the ground surface to a settling tank (not shown). As best seen in FIG. 1, the inner end 59 of the discharge trench 13 cuts into and fluidly communicates with the drainage trench 11.

Approximately a 1° slope is provided for the drainage trench 11, which slope begins at a point therein substantially diametrically opposite the drainage trench inner end 59, and which slope extends in both clockwise and counterclockwise directions from the point toward the end 59. In short, the opposite point is the high side of the drainage trench bottom surface 34 as it extends outwardly beyond the floor structure 10. The discharge trench 13 is then sloped further downwardly.

A specific example of a floor structure 10 with particular respect to the trenches is as follows, with all dimensions being approximate. The radius of the floor 10 (FIG. 1) is 24′, with a thickness of the slab 14 of 4″. Concrete of 2500 lb. quality is preferred. The radial distance from the periphery of the floor 10 to the outer edge of the drainage trench 11 is 12′, the width of the trench 5′, with 7′ the remaining radial dimension. A slope of ¾″ per radial foot is recommended for the floor 10.

The depth of the drainage trench outer and inner walls 26 and 27 (FIG. 3) is 1′, the vertical depth of the side walls 28 is 1′–9″, and the depth of the bottom wall 1′. The radial width of the channel 29 is 6″.

The depth of the discharge trench upper walls 46 and 47 (FIG. 2) is 1′–6″, the vertical depth of the side walls 48 is 1′–3″, and the depth of the bottom walls 49 and 51 is 1′–4″. The radial width of the channel 52 is 10″. It is recommended that the grate members 36 be spaced apart about 2″.

It has been found that by providing an annular drainage trench 11 and a radial discharge trench 13 as described hereinbefore, sufficient hydraulic pressure is provided by the liquid waste 44 (FIG. 3) for continually keeping the solid waste 43 moving along the channel 29 and outwardly through the discharge channel 52. With the solid waste 43 settled into the channel 29, and due to the cross-sectional configuration of the trench 11, the hydrostatic pressure builds up behind the solid waste and pushes it along the slightly inclined bottom surface 34 toward the discharge trench 13. The shape of the trench thereby obviates a build-up of stationary solid material upon the bottom surfaces 34 and 50.

Although a preferred embodiment of the invention has been described and disclosed herein, it is to be remembered that various alterations can be made thereto without departing from the true spirit and scope of the invention as defined by the appended claim.

I claim:

A farm animal feeding structure comprising in combination:

a floor having an annular trench formed therein with an inner perimeter and an outer perimeter, said trench having a cross-sectional shape substantially identical throughout its circumference;

said shape defined by a pair of upper radially spaced vertical walls connected to a pair of intermediate side walls converging downwardly at a 45° angle for connection in turn to a pair of vertical, radially spaced lower walls forming a channel, the lower walls interconnected across their bases;

grate means supported on said floor and continuously extending over said annular trench for passing animal wastes therethrough and into said annular trench, said grate means including a plurality of segmented, pie-shaped grates arranged in a contiguous side-by-side manner with each grate having a plurality of parallel, radially spaced members connected together at their ends, and with the length of said members progressively decreasing from the member closest to the outer perimeter to the member closest to the inner perimeter; and means formed in said floor and in fluid communication with said annular trench for leading the animal wastes away therefrom.

References Cited by the Examiner
UNITED STATES PATENTS

| 502,004 | 7/1893 | Logan | 119—28 |
|---|---|---|---|
| 1,711,004 | 4/1929 | Youngman | 119—28 X |
| 2,255,806 | 9/1941 | Overson | 119—16 |
| 2,305,259 | 12/1942 | Jeffers | 119—14.04 |
| 3,137,270 | 6/1964 | Rigterink et al. | 119—16 |

OTHER REFERENCES

German printed application, 1,110,463, July 1961, Priller, 119–15.

SAMUEL KOREN, *Primary Examiner.*

HUGH R. CHAMBLEE, *Examiner.*